United States Patent
Chen

(10) Patent No.: US 9,331,810 B2
(45) Date of Patent: May 3, 2016

(54) METHOD AND SYSTEM FOR PROVIDING DEDICATED SERVICE ON A PASSIVE OPTICAL NETWORK

(71) Applicant: Verizon Patent and Licensing Inc., Basking Ridge, NJ (US)

(72) Inventor: David Z. Chen, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 99 days.

(21) Appl. No.: 13/963,520

(22) Filed: Aug. 9, 2013

(65) Prior Publication Data

US 2015/0043916 A1 Feb. 12, 2015

(51) Int. Cl.
*H04B 10/00* (2013.01)
*H04J 14/00* (2006.01)
*H04J 14/02* (2006.01)
*H04B 10/50* (2013.01)

(52) U.S. Cl.
CPC ............ *H04J 14/025* (2013.01); *H04B 10/506* (2013.01); *H04J 14/0246* (2013.01); *H04B 10/505* (2013.01)

(58) Field of Classification Search
None
See application file for complete search history.

(56) References Cited

U.S. PATENT DOCUMENTS

| | | | | |
|---|---|---|---|---|
| 4,773,063 A * | 9/1988 | Hunsperger | ....... | G02B 6/12004 385/130 |
| 4,839,884 A * | 6/1989 | Schloss | ................... | H04J 14/02 372/46.012 |
| 5,864,413 A * | 1/1999 | Feldman | ............... | H04B 10/272 398/168 |
| 6,388,782 B1 * | 5/2002 | Stephens | ................. | H01S 5/146 372/18 |
| 7,155,127 B2 * | 12/2006 | Akimoto | ................ | H04B 10/40 385/24 |
| 8,041,217 B2 * | 10/2011 | Bouda | ................. | H04J 14/0227 398/100 |
| 8,521,025 B2 * | 8/2013 | Ansari | ................ | H04J 14/0282 398/58 |
| 8,855,492 B2 * | 10/2014 | Hood | .................. | H04J 14/0234 398/66 |
| 2002/0191904 A1 * | 12/2002 | Kani | ..................... | H04B 10/506 385/24 |
| 2003/0063385 A1 * | 4/2003 | Takushima | ............. | G02B 6/272 359/566 |
| 2008/0175592 A1 * | 7/2008 | Dai | ...................... | H04J 14/0282 398/87 |
| 2009/0103922 A1 * | 4/2009 | Lee | ..................... | H04J 14/0226 398/72 |
| 2013/0004172 A1 * | 1/2013 | Sugawa | ................ | H04J 3/1694 398/72 |

OTHER PUBLICATIONS

Vacca, John R., Optical Networking Best Practices Handbook, 2007, John Wiley & Sons, Inc., pp. 90-91.*
Al-Azzawi, Abdul, Fibre Optics: Principles and Practices, 2007, Taylor & Francis Group, LLC. p. 156.*

* cited by examiner

*Primary Examiner* — Ken N Vanderpuye
*Assistant Examiner* — Jai Lee

(57) ABSTRACT

An approach for providing dedicated service in a passive optical network (PON) is described. A dedicated service generates a multi-wavelength optical signal comprising a plurality of sub-signals corresponding to carrier wavelengths, modulate the plurality of sub-signals simultaneously with a content signal and transmit the plurality of sub-signals to one or more respective subscribers over an optical distribution network.

18 Claims, 12 Drawing Sheets

METHOD AND SYSTEM FOR PROVIDING DEDICATED SERVICE ON A PASSIVE OPTICAL NETWORK

BACKGROUND INFORMATION

Passive optical networks (PONs) provide service providers with an attractive source of revenue because of the longevity, low operational costs, and superior bandwidth offered by such networks. Subscribers prefer to obtain network connectivity via PONs because of their greater capacity and convenient access to various applications (e.g., Internet Protocol (IP) video, digital telephony, data). As the quantity of information and applications increases, so too does the desire for reliable, high-quality service. Traditionally, service providers have designed their PONs for higher downstream (in the direction from the service provider to the subscriber) than upstream (in the direction from the subscriber to the service provider) data traffic. As bandwidth usage patterns shift to more interactive usage (e.g., sharing personal video, data with other subscribers), the tolerance for errors or failures affecting upstream traffic has declined. Conventional traffic management in the upstream direction continues to rely on capacity sharing among subscribers. In addition to limiting the upstream speed, capacity sharing makes it more difficult for service providers to troubleshoot individual subscriber connections.

Therefore, there is a need for an approach that allows service providers to provide dedicated service to subscribers on existing PON networks while continuing to maintain low operational costs.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method and software for providing dedicated service on a PON is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

As used herein, the term "passive optical network" or "PON" may be used to refer to a flexible point-to-multipoint network architecture in which an unpowered optical distribution network (also referred to as an "optical distribution network") is used to interconnect a service provider's central office (CO) to subscribers. In one embodiment, a PON is a fiber optic access network providing so-called "last-mile" connectivity to the service provider's customers. PONs may come in a variety of flavors, including asynchronous transfer mode (ATM) PON (APON), gigabit PON (GPON), as well as Ethernet PON (EPON). Conventional PONs are single-channel systems; that is, the fiber infrastructure carries a single downstream (in the direction from the service provider to the subscriber) wavelength channel and a single upstream (in the direction from the subscriber to the service provider) wavelength channel, which are typically separated by wavelength division (WDM) multiplexing. As used herein, the term "optical distribution network" may be used in lieu of PON to refer to a tree of optical fibers in the optical access network of a particular PON.

Figure 1A:
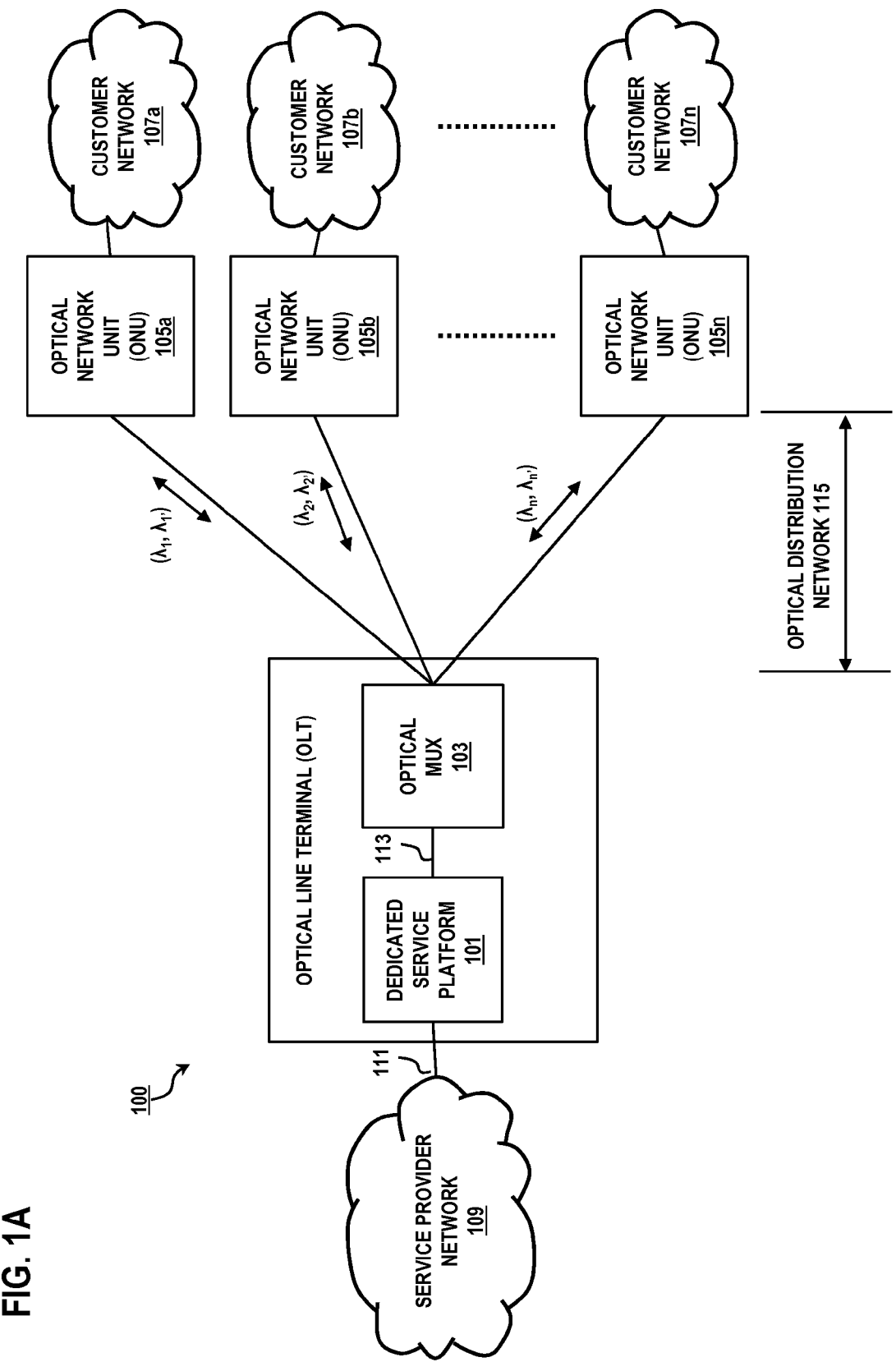
FIG. 1A is a diagram of a system capable of providing dedicated service, according to an exemplary embodiment.

FIG. 1A is a diagram of a system 100 capable of providing dedicated service on a PON, according to an exemplary embodiment. As illustrated, the system 100 may include a dedicated service platform 101, an optical multiplexer 103, one or more ONU 105a-105n (also referred to collectively as ONU 105), and one or more customer networks 107a-107n (collectively referred to as customer networks 107) associated with the corresponding ONU 105. In one embodiment, the dedicated service platform 101 may be connected to the service provider network 109 via a backhaul link 111. It is contemplated that the dedicated service platform 101 and the optical multiplexer 103 may be located at any point between the service provider network 109 and the ONU 105. In one embodiment, the dedicated service platform 101 and the optical multiplexer 103 may be implemented within or comprise an optical line terminal (OLT). In one embodiment, the OLT may be located in a CO.

As shown, the dedicated service platform 101 enables customer networks 107 to share a single fiber connection 113 running between the dedicated service platform 101 and the optical multiplexer 103. As used herein, the term "dedicated service" refers to the assignment of a unique pair of wavelengths (also referred to as a "lambda pair") to each subscriber on which to transmit and receive traffic. The lambda pair assigned to a particular subscriber is unique for the optical distribution network the subscriber is connected to. In one embodiment, each wavelength in the lambda pair is unique across the optical distribution network. For example, no two signals in the optical distribution network 115 have the same wavelength. As shown, each ONU (e.g., ONU 105a) receives a downstream signal on a first wavelength (e.g., $\lambda_1$) and transmits an upstream signal on a second wavelength (e.g., $\lambda_{1'}$) of a lambda pair. The lambda pairs (($\lambda_1, \lambda_{1'}$), ($\lambda_2, \lambda_{2'}$), ($\lambda_n, \lambda_{n'}$)) are unique in that no two wavelengths are the same in the upstream and/or downstream direction. As used herein, the term "optical signal" may be used to refer to any signal carried by the fiber infrastructure. Most PON networks utilize single channel WDM for upstream and downstream traffic on single-mode optical fiber. Various characteristics of the signal (e.g., wavelength, power) may be selected based on the type of fiber (single-mode or dual-mode), direction of transmission (upstream or downstream), path loss (based on transmission distance), and split ratio (e.g., 1:8, 1:16, 1:32, 1:64, etc.).

In one embodiment, the optical multiplexer 103 provides a split ratio of 1:N where N may be any positive integer. Typically, N is a power of 2 (e.g., 2, 4, 8, 16, 32, 64, 128, etc.). The number of subscribers served by the optical distribution network 115 may be varied by the service provider as desired. As used herein, the term "subscribers" refers both to individual subscribers (e.g., households) as well as larger multi-dwelling units (e.g., apartments) and business organizations. In one embodiment, the optical distribution network 115 may be further split at one or more points closer to the subscriber by utilizing optical splitters (not shown for illustrative convenience) at or near the ONU 105. By way of example, certain connections may serve groups of subscribers (e.g., a large corporate or university campus). The optical splitters may include an optical device that splits a beam of light into N beams of light. In the opposite direction, the optical splitters may combine the light beams received from an ONU (e.g., ONU 105a) into a single light beam and relay it to the optical multiplexer 103. In one embodiment, the upstream traffic is synchronized such that it can be multiplexed by the optical multiplexer 103 for transport on the fiber connection 113 by time division multiplexing (TDM). In the downstream direction, the optical multiplexer 103 de-multiplexes or otherwise separates sub-signals carried on the fiber connection 113 and forwards the sub-signals based on the wavelength of the sub-signal and the wavelength assignments. In one embodiment, the physical layer signaling may include automatic protection switching (APS) features and higher protocol layers may include encryption and flow control measures. The disclosure herein is independent of any particular physical, data or transmission layer protocols deployed on a PON network.

In one embodiment, the ONU 105 reside at one or more subscriber's premises. Each ONU may include a device that terminates the optical distribution network 115 and provides an interface to a customer network (e.g., customer network 107a) at the subscriber's premises. In one embodiment, the ONU 105 may provide multiple service interfaces (e.g., telephony, Ethernet, cable television, etc.) facing the subscriber. In this way, the ONU 105 may act as protocol translation or bridging devices for converting optical signals to electrical signals and vice versa. The ONU 105 are described in greater detail in relation to FIG. 4.

Figure 1B:
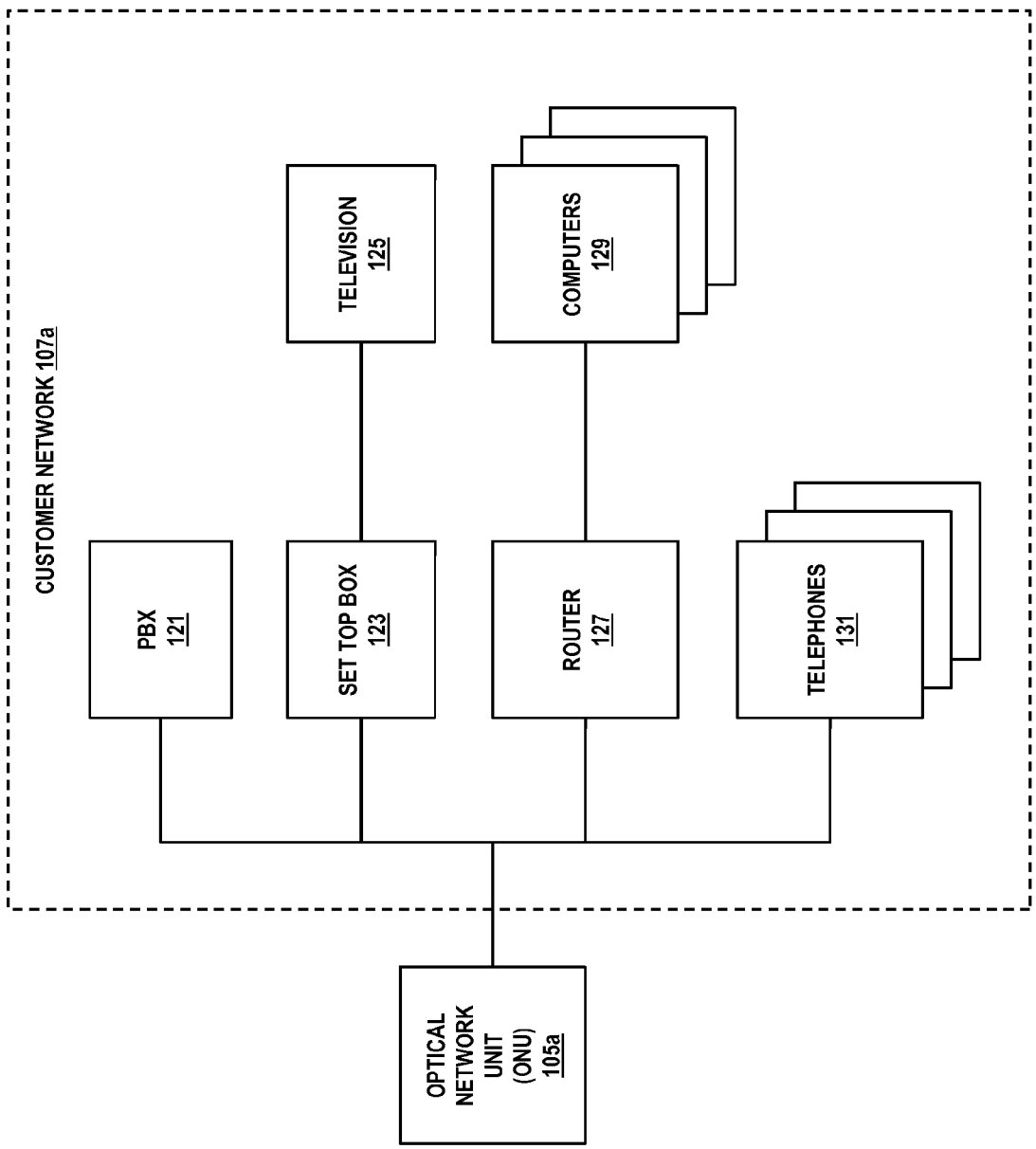
FIG. 1B is a diagram of a customer network, according to an exemplary embodiment.

FIG. 1B is a diagram of an exemplary customer network (e.g., customer network 107a), according to an embodiment. As illustrated, customer network 107a may include may include various devices at the subscriber's premises. By way of example, customer network 107a may include a private branch exchange (PBX) 121, a set-top box 123 and a corresponding television monitor 125, a router 127 and one or more corresponding computers 129, and telephones 131. For example, the PBX 121 may include a private telephone network that may be used within a business organization such that users may share a number of outside lines for making telephone calls. In one embodiment, the optical distribution network 115 provides support to telephony signaling protocols (e.g., signaling system 7 (SS7)) at the data layer in accordance with various international standards (e.g., International Telecommunications Union standard G.984.2). The set-top box 123 may include a device that may connect to a communication channel (e.g., a cable television line) and may produce output on the television monitor 125. Set-top box 123 may be used to receive and decode digital television signals as well as to execute a variety of advanced interactive applications such as videoconferencing, home networking, IP telephony, video on demand (VOD), high-speed Internet television services, etc.). The router 127 may include a device that forwards information to one or more of the computers 129. By way of example, the router 127 may include a wired or wireless routing or bridging device that sends and receives data to the computers 129.

By way of example, computers 129 may be any type of fixed or mobile terminal including a mobile handset, mobile station, mobile unit, multimedia computer, multimedia tablet, communicator, netbook, Personal Digital Assistants (PDAs), smartphone, media receiver, etc. It is also contemplated that the computers 129 may support any type of interface for supporting the presentment or exchange of data. In addition, computers 129 may facilitate various input means for receiving and generating information, including touch screen capability, keyboard and keypad data entry, voice-based input mechanisms, accelerometer (e.g., shaking the computers 129), and the like. Any known and future implementations of computers 129 are applicable. It is noted that, in certain embodiments, the computers 129 may be configured to detect context data using a variety of technologies—i.e., near field communication (NFC), Bluetooth, infrared, etc. Also, connectivity may be provided via a wireless local area network (LAN). By way of example, a group of computers 129 may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each computers 129, i.e., IP addresses that are accessible to devices connected to the service provider network 109 as facilitated via a router.

As mentioned, subscribers may receive various services supported by the optical distribution network 115. These may include asymmetrical broadband services (e.g., digital broadcast services, VOD, file downloads, online gaming, etc.), symmetrical broadband services (e.g., content broadcast, electronic mail (e-mail), file exchange, distance learning, telemedicine, etc.), as well as low bandwidth plain old telephone service (POTS) and integrated services digital network (ISDN) services. As used herein, the terms "asymmetrical" and "symmetrical" are used to refer to the relative bandwidth capacity or bandwidth consumption in the downstream and upstream legs of a PON. Typically, service providers provision the downstream bandwidth to be greater than upstream bandwidth based on historical usage patterns of subscribers. For example, the downstream bandwidth in a GPON may provide subscribers a data rate of 2.5 gigabits per second (G/s or Gbps) whereas the upstream bandwidth may provide 1.5 Gbps. That is, most services have traditionally focused on the distribution of content towards subscribers. As bandwidth usage patterns shift to more interactive usage (e.g., sharing personal video, data with other subscribers), subscriber have become less tolerant of errors or failures affecting upstream traffic. Conventional traffic management in the upstream direction continues to rely on capacity sharing among subscribers. However, in addition to limiting the upstream speed, capacity sharing makes it more difficult for service providers to troubleshoot individual subscriber connections To address this issue, the system 100 of FIG. 1A introduces the capability to provide dedicated service to subscribers. The dedicated service platform 101 allows each customer network to send and receive traffic via a unique pair of non-overlapping wavelengths specifically assigned to the subscriber. Because the traffic in either the upstream or direction is transported on a dedicated wavelength instead of being multiplexed on a single wavelength, there is no need for capacity sharing. Furthermore, troubleshooting of technical issues associated with a particular subscriber's service is simplified because each wavelength can be traced independently of the others to determine physical and optical continuity of an upstream or downstream connection. In addition, the system 100 allows service providers to greatly increase the number of subscribers on a given optical distribution network because the upstream and downstream traffic is no longer constrained by the capacity of a single wavelength. The only constraint to scaling the number of subscribers is the power budget for the optical distribution network 115 and the upper limit of optical splitting for certain large subscriber groups (e.g., corporate or university campuses, large residential compounds, etc.).

Figure 1C:
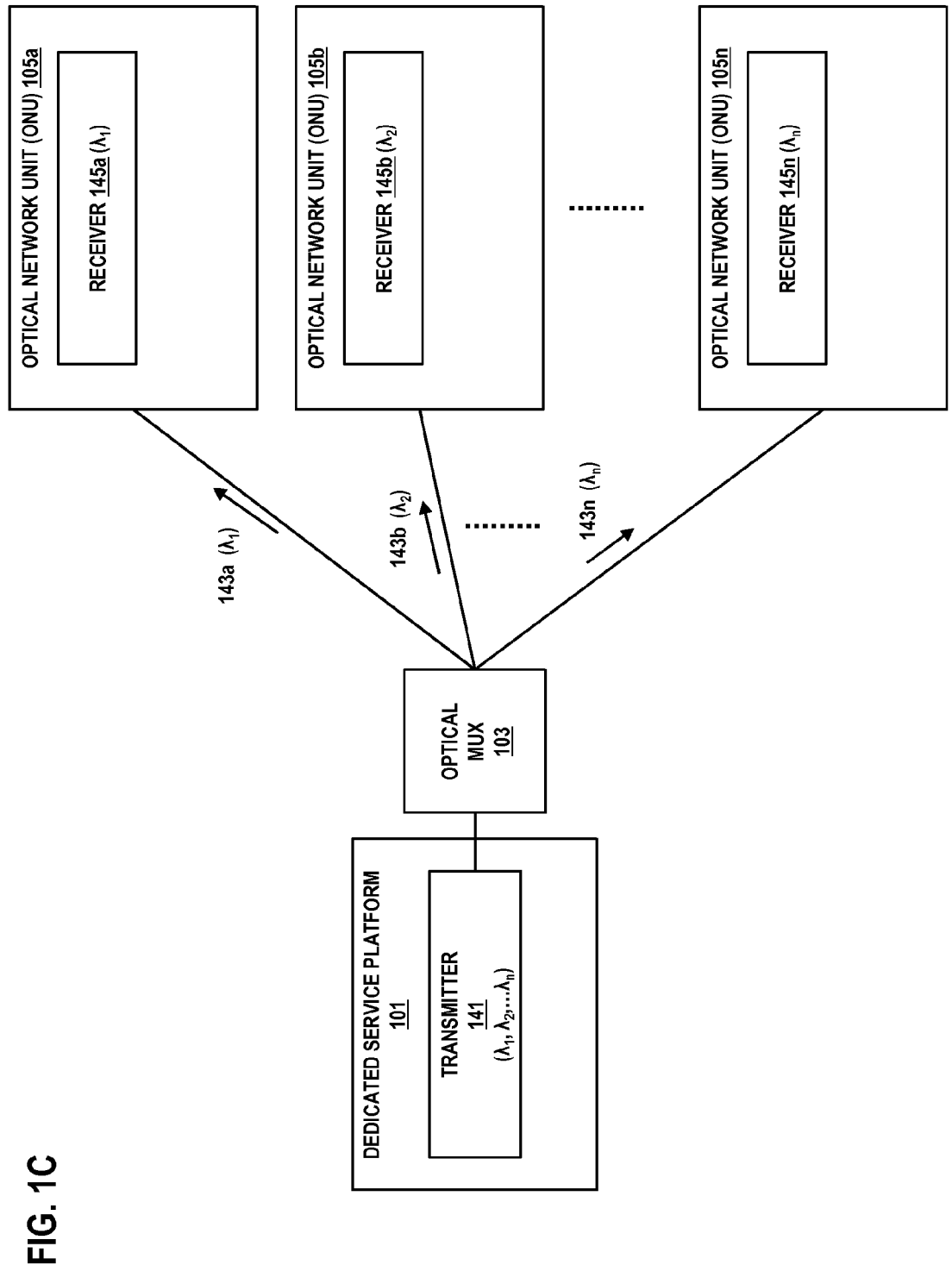
FIGS. 1C and 1D are diagrams of a PON configured to provide dedicated service, according to an exemplary embodiment.

The operation of the dedicated service platform 101 may be explained in greater detail with reference to FIG. 1C. In one embodiment, the transmitter 141 of the dedicated service platform 101 generates a modulated multi-wavelength modulated optical signal that includes sub-signals with wavelengths $\lambda_1, \lambda_2 \ldots \lambda_n$. The sub-signals are separated by the optical multiplexer 103 and each sub-signal signal is transmitted to a subscriber via one of the downstream signals 143a-143n (collectively referred to as downstream signals 143). For example, the downstream signal 143a has wavelength $\lambda_1$ and is based on the corresponding sub-signal of the multi-wavelength modulated optical signal generated by the dedicated service platform 101. Similarly, the downstream signal 143b has wavelength $\lambda_2$ and is based on the corresponding sub-signal of the multi-wavelength modulated optical signal. As further shown, the ONU 105 are configured to receive the downstream signals 143 at the assigned wavelengths. For example, the receiver 145a of the ONU 105a is configured to receive a downstream signal at the wavelength $\lambda_1$. Similarly, the receivers 145b through 145n are configured to receive downstream signals at wavelengths $\lambda_2$ through $\lambda_n$, respectively.

Figure 1D:
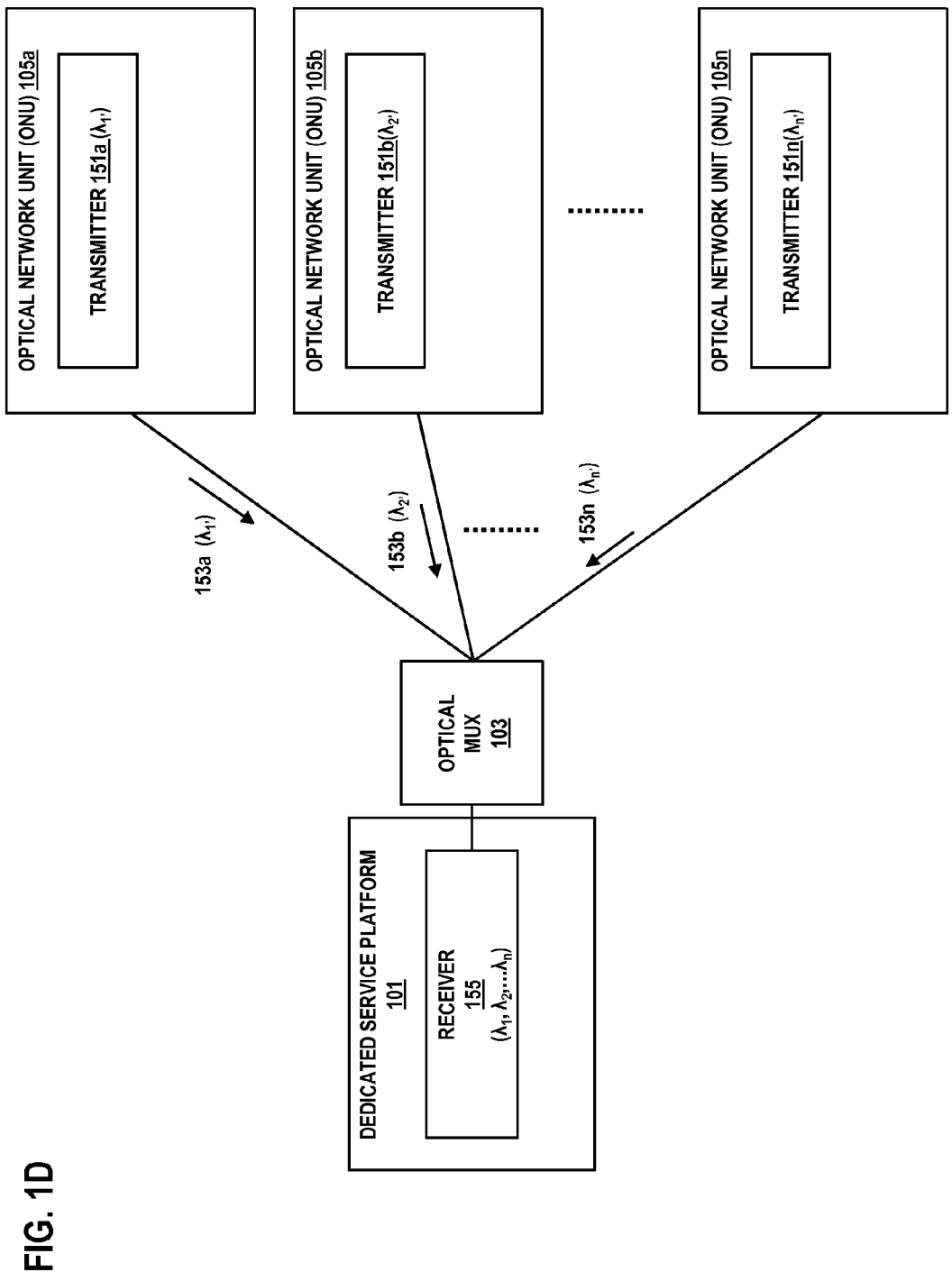

As further illustrated in FIG. 1D, the dedicated service platform 101 is also configured to receive one or more upstream signals transmitted by the ONU 105. In one embodiment, the ONU 105 are equipped with tunable laser transmitters 151a-151n (collectively referred to as transmitters 151). As shown, each transmitter generates an upstream signal 153a-153n at a unique wavelength $\lambda_{1'}, \lambda_{2'} \ldots \lambda_{n'}$. For example, the upstream signal 153a has a wavelength of $\lambda_{1'}$ and the upstream signal 153b has a wavelength of $\lambda_{2'}$. The upstream signals 153 are combined by the optical multiplexer 103 into a single multi-wavelength signal that is then received by the receiver 155 in the dedicated service platform 101. In one embodiment, the upstream and downstream signals are symmetrical.

Figure 2:
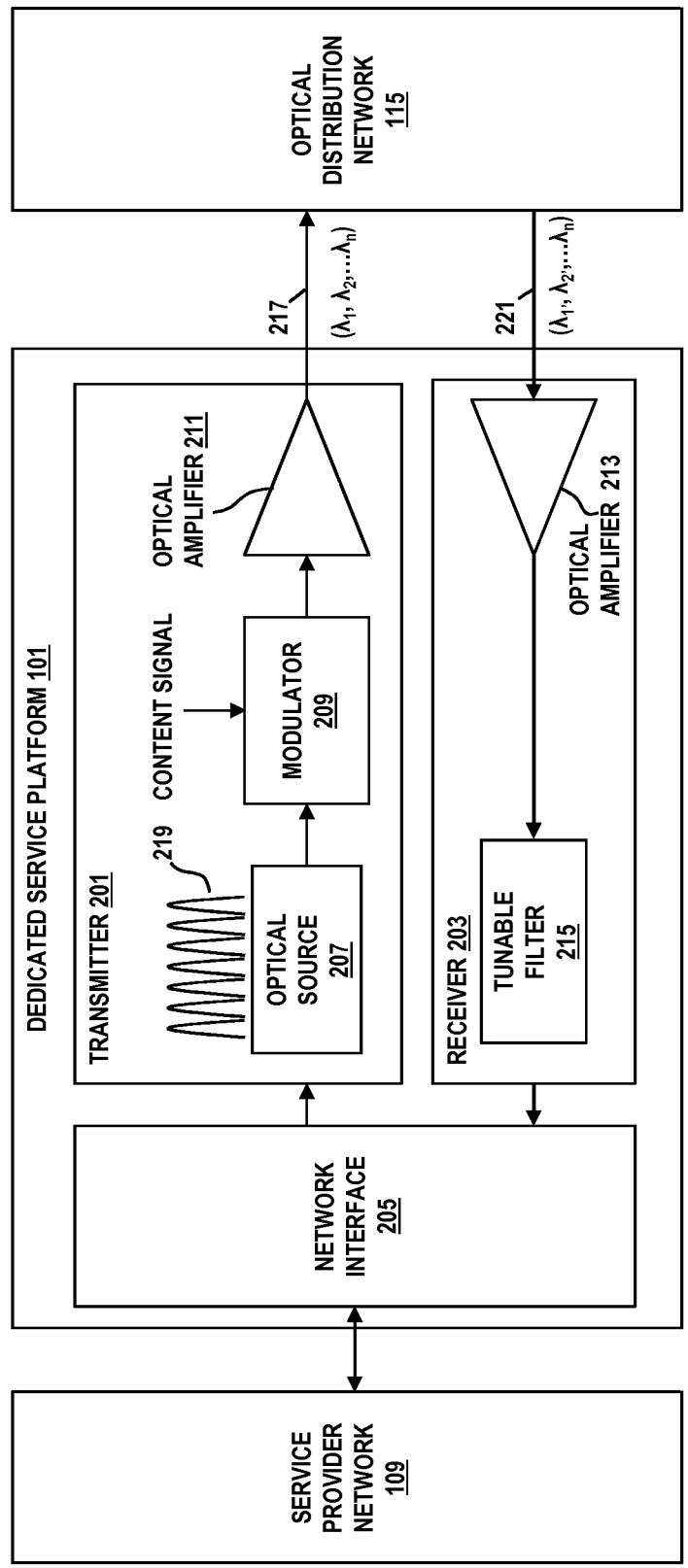
FIG. 2 is a diagram of the components of a dedicated service platform, according to an exemplary embodiment.

FIG. 2 is a diagram of the components of the dedicated service platform 101, according to an exemplary embodiment. The dedicated service platform 101 may comprise computing hardware (such as described with respect to FIG. 6), as well as include one or more components configured to execute the processes described herein for providing dedicated service on an optical distribution network 115 in the system 100. It is contemplated that the functions of these components may be combined in one or more components or performed by other components of equivalent functionality. In one implementation, the dedicated service platform 101 includes a transmitter 201, a receiver 203 and a network interface 205. The transmitter 201 may include an optical source 207, a modulator 209 and an optical amplifier 211 and the receiver 203 may include an optical amplifier 213 and a tunable filter 215.

In one embodiment, the dedicated service platform 101 may be implemented as a line terminal residing in an optical line terminal (OLT) as may be located, for example, at a CO. Each line terminal may include the components described with respect to FIG. 2, including an interface between the optical distribution network 115 and the service provider network 109. In one embodiment, the network interface 205 may provide Ethernet aggregation capabilities to provide additional capacity and protection switching functions for the backhaul traffic links (not shown for illustrative convenience). The network interface 205 may receive downstream traffic from various voice, data or video networks (not shown for illustrative convenience) connected to the service provider network 109 and forward it to the transmitter 201. In one embodiment, the transmitter 201 converts the downstream traffic into the downstream optical signal 217 for transmission over the optical distribution network 115. In one embodiment, the modulator 209 is used to modulate the carrier optical signal 219 generated by the optical source 207. The network interface 205 may also receive upstream traffic from the optical distribution network 115 via the receiver 203 and transmit it to the service provider network 109 after suitable processing and any required signal conversions.

In one embodiment, the carrier optical signal 219 may be generated by a comb laser. By way of example, the optical source 207 may include a mode locked laser (e.g., fixed comb laser) that produces a series of optical pulses separated in time by a round-trip time of a laser cavity. A spectrum of such an optical pulse train may include a series of delta functions separated by a repetition rate (e.g., an inverse of the round-trip time) of the laser. Such a series of sharp spectral lines may form what may be referred to as a "frequency comb" because it contains pulses with multiple wavelengths (and, therefore, frequencies). In one embodiment, the optical source 207 may include a comb laser having a wide operation bandwidth that supports 50-100 wavelength pulses.

In one embodiment, the carrier optical signal 219 is modulated (e.g., via amplitude modulation (AM)) by a content signal. In one embodiment, the modulator 209 may use a content signal derived from the downstream traffic to modulate the carrier optical signal 219. As mentioned, the downstream traffic received from the service provider network 109 may contain voice, data and video information received from various voice, video or data networks (not shown for illustrative convenience) that are connected to the service provider network 109. In one embodiment, the component pulses of the carrier optical signal 219 are modulated as a group (also referred to herein as "direct" modulation). As mentioned, the optical source 207 may produce 50-100 pulses of different wavelengths. Direct modulation results in the various component pulses of the carrier optical signal 219 being simultaneously modulated with the same content signal.

As mentioned earlier, the dedicated service platform 101 enables a service provider to support a much larger number of subscribers on an optical distribution network. As a result, the optical distribution network 115 may be denser in terms of its tree structure compared to conventional fiber access networks. In order to compensate for the increased signal attenuation in such a network, it may be necessary to raise the power level of the modulated signal before transmission. In one embodiment, the dedicated service platform 101 may include optical amplifiers in the downstream and upstream transmission paths. For example, the optical amplifier 211 in the transmitter 201 may be used to amplify the signal received from the modulator 209. The power gain for the optical amplifier 211 may be determined according to the desired optical budget. Typically, the amount of attenuation introduced by the addition of a splitter leg is approximately 3 decibels (dB). However, this number may vary depending on the quality of the deployed splitters (e.g., planar lightwave circuit (PLC) splitters show considerably reduced attenuation of approximately 1 dB). As shown, the receiver 203 may also be equipped with an optical amplifier (optical amplifier 213) to raise the power level of the signals in the upstream direction.

As illustrated, the dedicated service platform 101 transmits to the optical distribution network 115 a downstream optical signal 217 that includes sub-signals with wavelengths $\lambda_1$, $\lambda_2 \ldots \lambda_n$ and it receives an upstream optical signal 221 that includes sub-signals with wavelengths $\lambda_{1'}, \lambda_{2'} \ldots \lambda_{n'}$. In one embodiment, the sub-signals in the downstream optical signal 217 are separated out and individually transmitted to individual subscribers via the optical distribution network 115. The upstream optical signal 221 may have been processed to combine, or otherwise interleave, optical signals received from the subscribers via the optical distribution network 115. In one embodiment, the processing of the downstream and upstream optical signals 217 and 221, respectively, is performed by an optical multiplexer (e.g., optical multiplexer 103).

Figure 3:
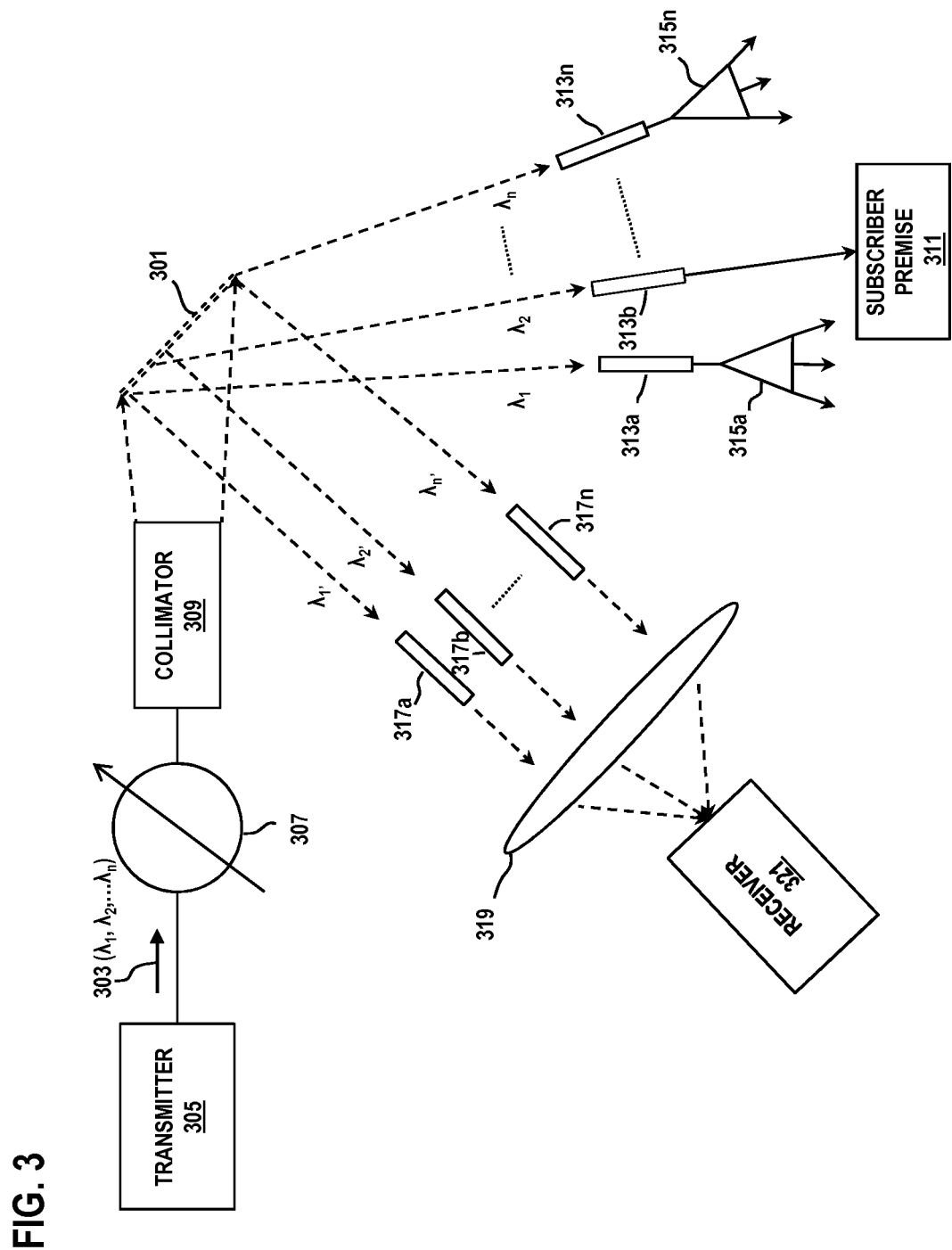
FIG. 3 is a diagram of an optical multiplexer, according to an exemplary embodiment.

FIG. 3 illustrates an optical multiplexer, according to an exemplary embodiment. As shown, the optical multiplexer 301 receives at its surface optical waves over an air (or other) non-bounded medium and disperses or otherwise separates component waves according to their respective wavelengths. In one embodiment, the optical multiplexer 301 is a high-quality diffraction grating calibrated to separate the wavelengths $\lambda_1, \lambda_2 \ldots \lambda_n$ of a multi-wavelength modulated optical signal 303 received from the transmitter 305 via the optical isolator 307 (optionally inserted to prevent any unwanted reflections from the optical multiplexer 301 to travel towards the transmitter 305) and collimator 309. In one embodiment, the transmitter 305 corresponds to or incorporates the functionality of the transmitter 201 in FIG. 2. As shown, the multi-wavelength modulated optical signal 303 is received via the collimator 309 before being propagated in open space (as indicated by the broken lines) to the optical multiplexer 301. The optical multiplexer 301 separates sub-waves of unique wavelengths and transmits them towards the subscribers in the downstream direction. As mentioned, the number of subscribers receiving service via the dedicated service platform 101 may greatly exceed conventional PON limitations on the number of subscribers. In one embodiment, the waves are collimated by collimators 313a-313n (collectively referred to as collimators 313) before being transported to a single subscriber (e.g., subscriber premise 311) or distributed among multiple subscribers via an optical splitter (e.g., optical splitter 315a).

As illustrated, the optical multiplexer 301 also receives at its surface optical waves traveling in the upstream direction. The optical multiplexer 301 separates these waves in a different direction than the downstream waves and directs them to the collimators 317a-317n (collectively referred to as collimators 317). The collimated waves are then combined by a converging lens 319 and received at the receiver 321 as a waveguide optical signal. In one embodiment, the receiver 321 corresponds to or incorporates the functionality of the receiver 203 in FIG. 2.

Although the optical multiplexer 301 has been described as a diffraction grating, it is contemplated that other optical or electronic components may be used to separate sub-signals generated by the transmitter 305. In one embodiment, the sub-signals may be separated temporally by using a commercially available interleaver (e.g., WDM interleaver). Alternatively, the sub-signals may be filtered in the time domain to separate out the portions with different wavelengths. It is further contemplated that the features of the optical multiplexer 301 are independent of any particular implementation. For example, portions of the optical multiplexer 301 and the collimators 313 and 317 may be integrated or be made a part of the dedicated service platform 101. In addition, or alternatively, the optical multiplexer 301 may be combined with one or more elements in the optical distribution network 115 without modifying its principle of operation.

Figure 4:
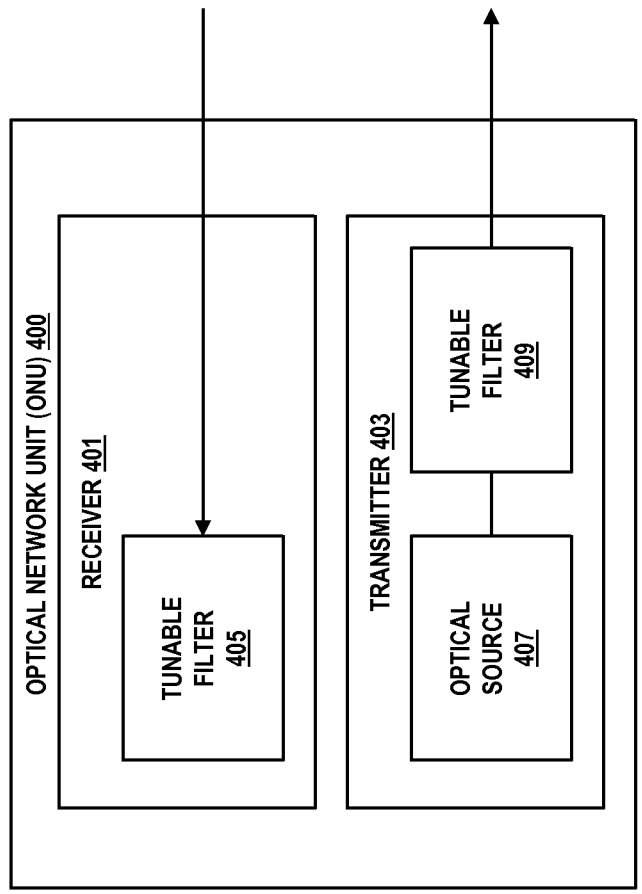
FIG. 4 is a diagram of an optical network unit (ONU), according to an exemplary embodiment.

FIG. 4 is a diagram of an ONU 400, according to an exemplary embodiment. As illustrated, the ONU 400 may include a receiver 401 and a transmitter 403. In one embodiment, the receiver 401 includes a tunable filter 405. The receiver 401 may be any device capable of receiving optical signals in the downstream direction. In one embodiment, the transmitter 403 includes an optical source 407 and a tunable filter 409. The transmitter 403 may include any device capable of transmitting an optical signal in the upstream direction. In one embodiment, the tunable filters 405 and 409 may be an optical filter that selectively transmits or receives light within a specified wavelength range while blocking all other light. The tunable filter 405 may include a narrow band (e.g., from 6 to 8 nanometers (nm)) optical filter that may tune approximately 2 nm per wavelength. In one embodiment, the receiver 401 corresponds to the receivers 147 in FIG. 1C. As described with respect to FIG. 1C, the receivers 147 of the ONU 105 may be individually configured to receive optical signals within a specified wavelength range. Similarly, the tunable filter 405 may be tuned to a specific wavelength assigned to a particular subscriber. In one embodiment, the transmitter 403 corresponds to the transmitters 151 in FIG. 1D. As described with respect to FIG. 1D, the transmitters 151 of the ONU 105 may be individually configured to only allow transmission of optical signals within a specified wavelength range. In one embodiment, the signal generated by the optical source 407 lies within a specified wavelength range assigned to the subscriber. The tunable filter 409 may be tuned to allow transmission of only the unique wavelength assigned to that subscriber.

The optical source 407 may include any device capable of generating optical signals. In one embodiment, the optical source 407 may be a tunable laser or a low-cost comb laser having a narrow operation bandwidth (e.g., 6 to 8 nm) and being capable of producing four to five laser pulses with each laser pulse modulated anywhere from zero to ten Gbps. One advantage of using dedicated wavelength optical signals in the transmitter is that unwanted bias current produced in burst mode transmitters (as a result of short timing restrictions) is avoided. However, it is contemplated that in an alternative embodiment, the transmitter 403 of the ONU 400 may not include a tunable filter 409 and operate in burst mode at maximum burst rates of approximately 10 Gbps.

Figure 5A:
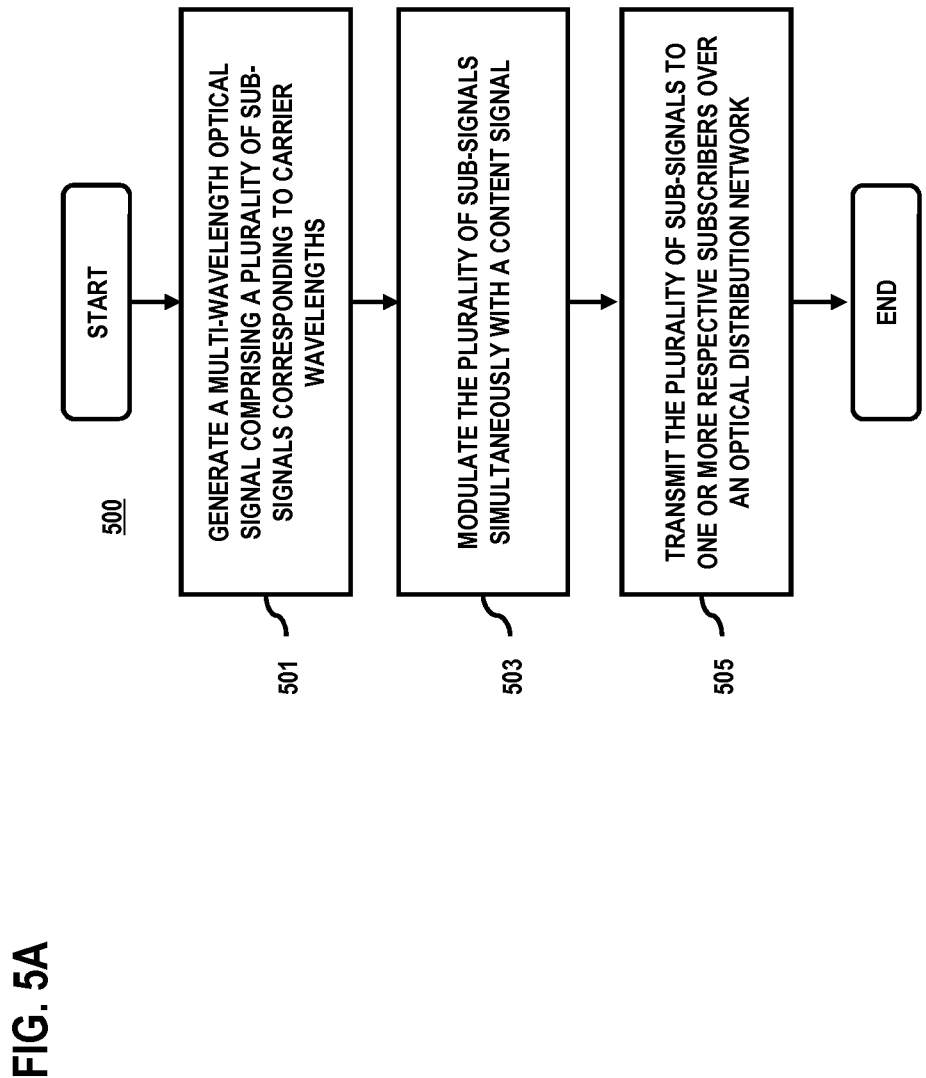
FIGS. 5A through 5C are flowcharts depicting processes for providing dedicated service, according to an exemplary embodiment.

FIG. 5A is a flowchart of a process for providing dedicated service, according to an exemplary embodiment. For illustrative purpose, process 500 is described with respect to the system of FIG. 1A and the components of the dedicated service platform 101 in FIG. 2. It is noted that the steps of process 500 may be performed in any suitable order, as well as combined or separated in any suitable manner.

In step 501, a multi-wavelength optical signal comprising a plurality of sub-signals corresponding to carrier frequencies is generated. In one embodiment, the optical source 207 in the dedicated service platform 101 generates the multi-wavelength optical signal using a comb laser. The multi-wavelength signal includes sub-signals with each sub-signal having a unique wavelength. In one embodiment, the sub-signals have wavelengths $\lambda_1, \lambda_2 \ldots \lambda_n$, where n may vary depending on the operating range of the comb laser (e.g., narrowband, broadband).

In step 503, the plurality of sub-signals is modulated simultaneously with a content signal. In one embodiment, the modulator 209 in the dedicated service platform 101 receives the multi-wavelength optical signal from the optical source 207 and modulates (e.g., via AM modulation). The content signal may be derived from the downstream traffic received via the service provider network 109. In one embodiment, the sub-signals are modulated simultaneously such that each sub-signal is modulated with the same information.

In step 505, the plurality of sub-signals is transmitted to one or more respective subscribers over an optical distribution network. In one embodiment, each subscriber connected to the optical distribution network 115 is assigned a unique wavelength pair for downstream/upstream transmission. That is, each subscriber receives service via a dedicated lambda pair. In one embodiment, the sub-signals are amplified prior to transmission over the optical distribution network 115.

Figure 5B:
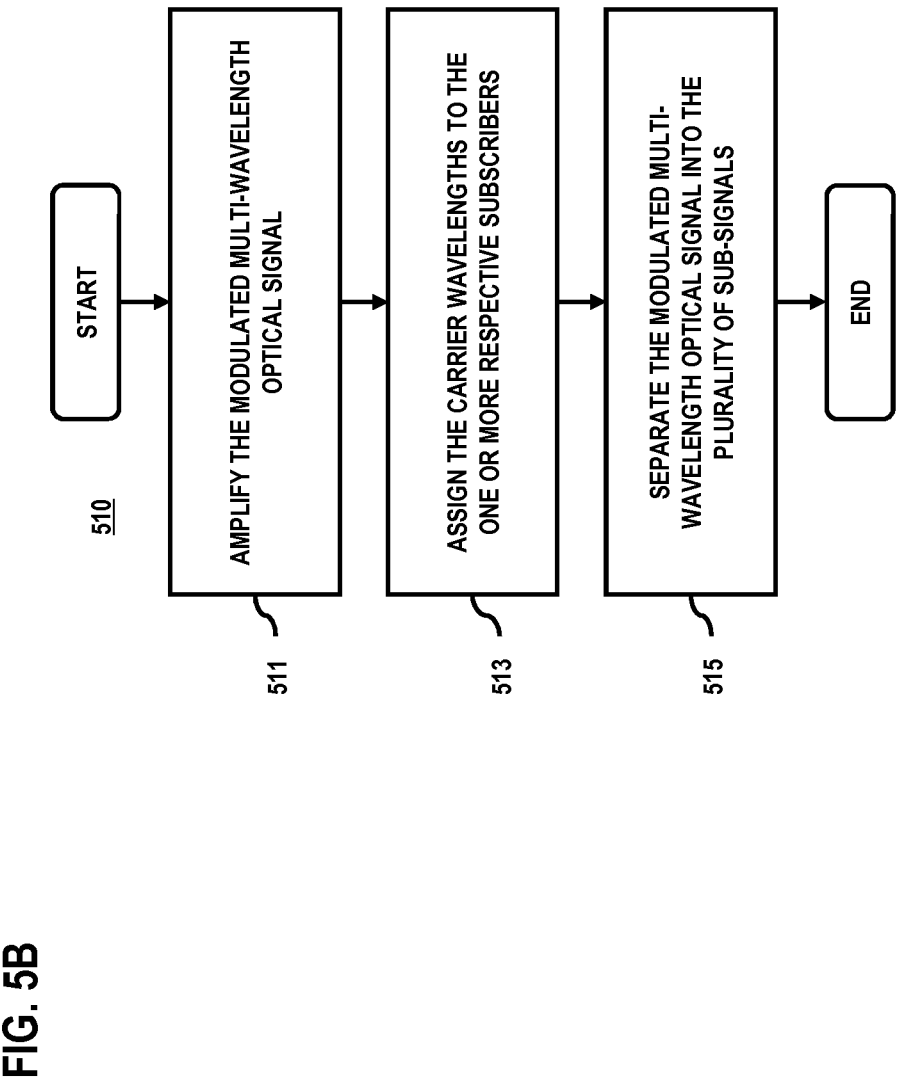

FIG. 5B is a flowchart of a process for separating the modulated multi-wavelength optical signal into the plurality of sub-signals, according to an exemplary embodiment. For illustrative purpose, process 510 is described with respect to the system of FIG. 1A and the components of the dedicated service platform 101 in FIG. 2. It is noted that the steps of process 510 may be performed in any suitable order, as well as combined or separated in any suitable manner.

In step 511, the modulated multi-wavelength optical signal is amplified. In one embodiment, the optical amplifier 211 may be used to amplify the multi-wavelength optical signal after it has been modulated by the modulator 209. The amount of amplification may vary depending on the number of subscribers served by the optical distribution network the platform is connected to. In one embodiment, the amount of amplification is budgeted to take into account the attenuation caused by passive or powered optical splitters, physical distance between the dedicated service platform 101 and the subscriber's ONU (e.g., ONU 105a).

In step 513, the one or more subscribers are assigned carrier wavelengths. In one embodiment, a control unit or manual provisioning may determine the assignment of carrier wavelengths to each subscriber. Each subscriber is assigned a unique pair of wavelengths corresponding to the wavelengths of the upstream and downstream optical signals. In step 515, the modulated multi-wavelength optical signals are separated into the plurality of sub-signals. In one embodiment, the optical multiplexer 103 is used to separate the sub-signals spatially. In one embodiment, the separation may be performed by a high quality optical diffraction grating or similar optical dispersion apparatus (e.g., prism). In another embodiment, the sub-signals may be separated by filtering the multi-wavelength optical signal in the time domain.

Figure 5C:
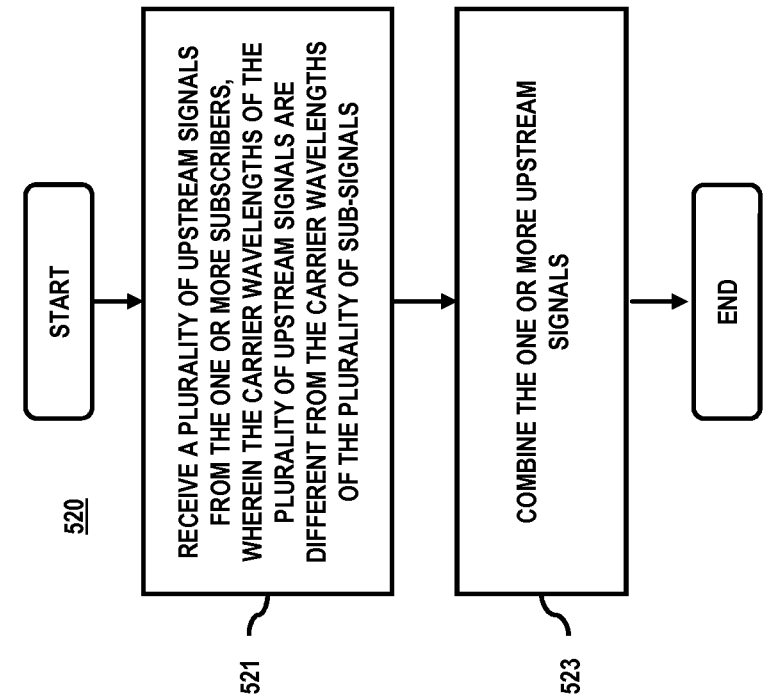

FIG. 5C is a flowchart of a process for receiving one or more upstream signals from the one or more subscribers, according to an exemplary embodiment. For illustrative purpose, process 520 is described with respect to the system of FIG. 1A and the components of the dedicated service platform 101 in FIG. 2. It is noted that the steps of process 520 may be performed in any suitable order, as well as combined or separated in any suitable manner.

In step 521, upstream signals from the subscribers are received. In one embodiment, the upstream signals are transmitted by the ONU 105 at the subscriber's premises and are received at the optical multiplexer 103. In one embodiment, the wavelengths of the upstream signals are different from the wavelengths of the sub-signals transmitted in the downstream direction. In one embodiment, the transmitter in the ONU 105 is a tunable laser that may be tuned to transmit at the unique wavelength assigned to the subscriber. By way of example, the tunable laser may be a mode locked comb laser configured to generate pulses within a narrow wavelength range.

In step 523, the upstream signals are combined. In one embodiment, the optical multiplexer 103 diffracts the upstream signals in a direction different than the downstream signals and causes the upstream signals to be collected and combined via a series arrangement of collimators and converging optics. The converged signals may be then multiplexed (e.g., by TDM) and supplied to the receiver 203. In one embodiment, the upstream signals may be combined by other optical interleaving devices or apparatuses (e.g., WDM optical interleaver, optical add-drop multiplexer, etc.). Such interleaving may be performed following convergence and collection of the upstream signals for waveguide transmission.

Figure 6:
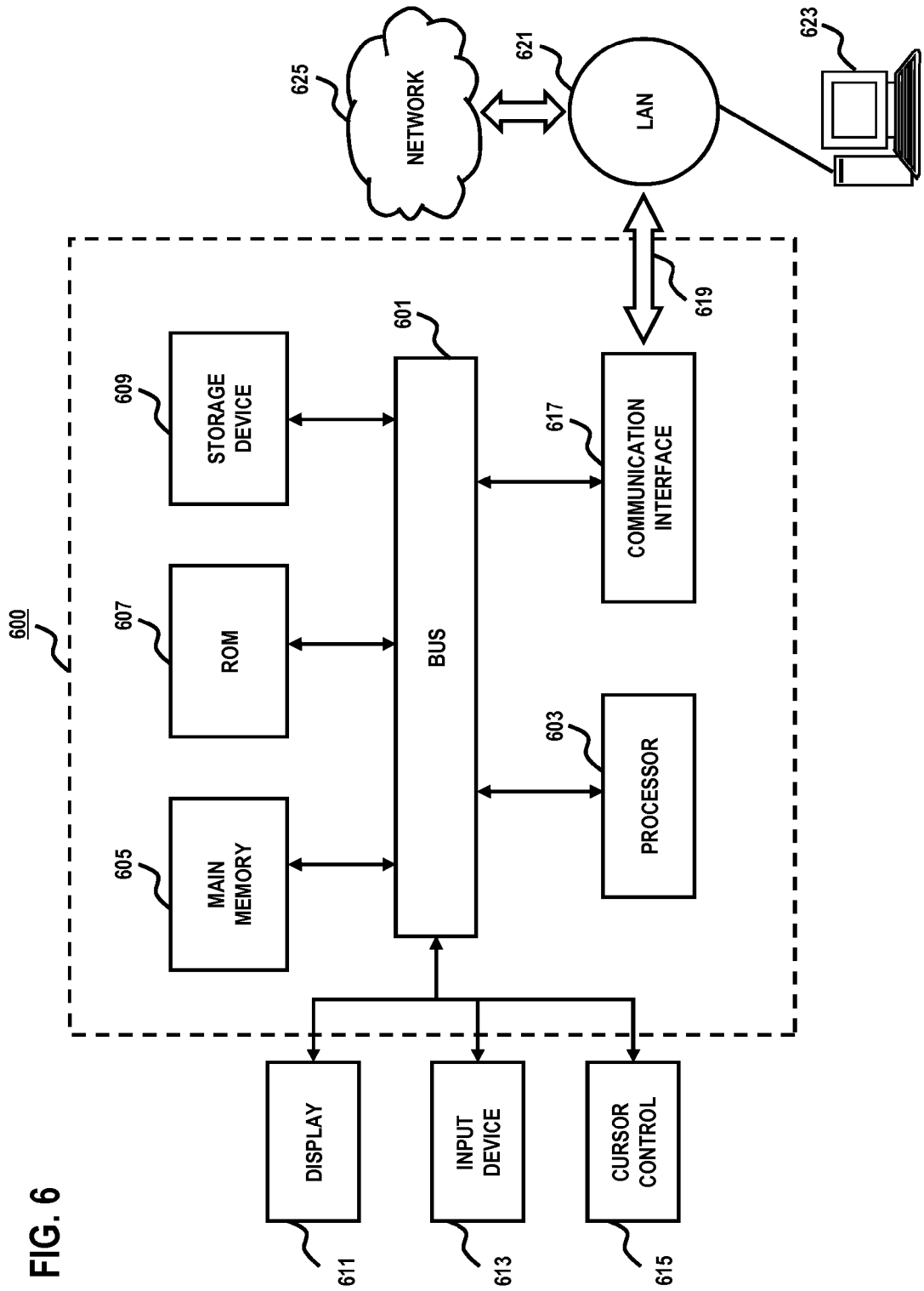
FIG. 6 is a diagram of a computer system that can be used to implement various exemplary embodiments.

FIG. 6 is a diagram of a computer system that can be used to implement various exemplary embodiments. The computer system 600 includes a bus 601 or other communication mechanism for communicating information and one or more processors (of which one is shown) 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk, flash storage, or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. Additional output mechanisms may include haptics, audio, video, etc. An input device 613, such as a keyboard including alphanumeric and other keys, is coupled to the bus 601 for communicating information and command selections to the processor 603. Another type of user input device is a cursor control 615, such as a mouse, a trackball, touch screen, or cursor direction keys, for communicating direction information and command selections to the processor 603 and for adjusting cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an ISDN card, a cable modem, a telephone modem, or any other communication interface to provide a data communication connection to a corresponding type of communication line. As another example, communication interface 617 may be a LAN card (e.g. for Ethernet™ or an ATM network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 7:
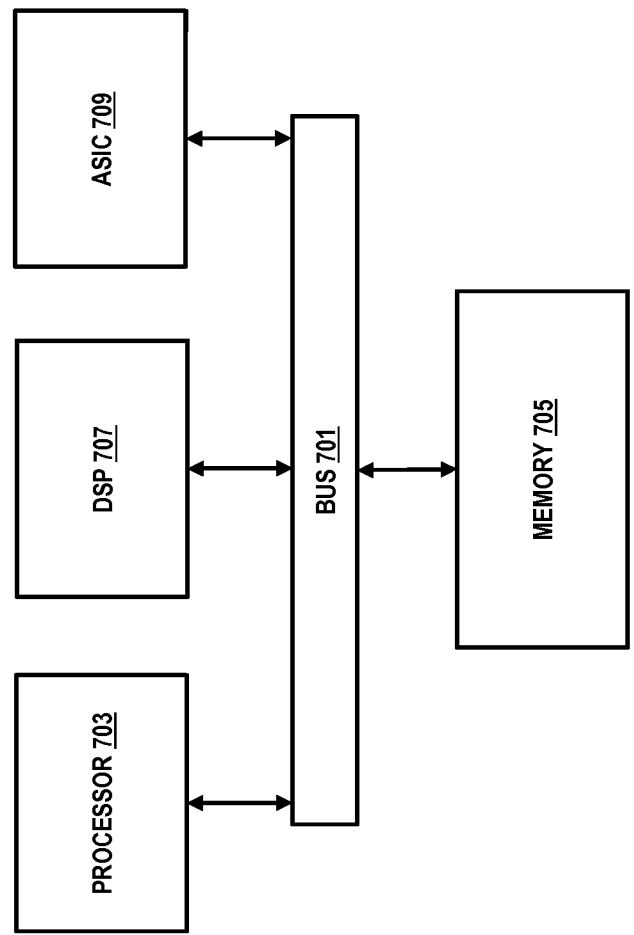
FIG. 7 is a diagram of a chip set that can be used to implement an embodiment of the invention.

FIG. 7 illustrates a chip set or chip 700 upon which an embodiment of the invention may be implemented. Chip set 700 is programmed to enable cloud-based profile access as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of enabling the management of device profiles.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to enable cloud-based profile access. The memory 705 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    generating, at an optical line terminal, a multi-wavelength optical signal comprising a plurality of sub-signals corresponding to carrier wavelengths;
    modulating, at the optical line terminal, the plurality of sub-signals simultaneously with a content signal;
    amplifying, at the optical line terminal, the modulated multi-wavelength optical signal;
    assigning, at the optical line terminal, the carrier wavelengths to the one or more respective subscribers;
    separating, at the optical line terminal, the modulated multi-wavelength optical signal into the plurality of sub-signals via an optical multiplexer;
    transmitting, at the optical line terminal, the plurality of sub-signals individually from the optical line terminal to one or more respective subscribers over an optical distribution network;
    receiving, at the optical line terminal, over the optical distribution network, a plurality of upstream signals from the respective one or more subscribers; and
    combining, at the optical line terminal, the plurality of upstream signals,
    wherein separating the modulated multi-wavelength optical signal into the plurality of sub-signals via the optical multiplexer comprises:
    providing the amplified modulated multi-wavelength optical signal to an optical isolator,
    providing an output of the optical isolator to a collimator, and
    propagating, in open space, outputs of the collimator to the optical multiplexer.

2. A method according to claim 1, wherein the modulated multi-wavelength optical signal is separated by diffraction.

3. A method according to claim 1, wherein the multi-wavelength optical signal is generated by a comb laser.

4. A method according to claim 1 wherein the carrier wavelengths of the plurality of upstream signals are different from the carrier wavelengths of the plurality of sub-signals.

5. A method according to claim 4, wherein the plurality of upstream signals are combined by diffraction.

6. A method according to claim 4, wherein the plurality of upstream signals and the plurality of sub-signals are symmetrical.

7. A method according to claim 1, wherein the optical distribution network is a passive optical network (PON).

8. An optical line terminal comprising:
    at least one processor; and
    at least one memory including computer program code for one or more programs,
    the at least one memory and the computer program code configured to, with the at least one processor, cause the optical line terminal to perform at least the following,
    generate a multi-wavelength optical signal comprising a plurality of sub-signals corresponding to carrier wavelengths;
    modulate the plurality of sub-signals simultaneously with a content signal;
    amplify the modulated multi-wavelength optical signal;
    assign the carrier wavelengths to the one or more respective subscribers; and
    separate the modulated multi-wavelength optical signal into the plurality of sub-signals;
    transmit the plurality of sub-signals individually from the optical line terminal to one or more respective subscribers over an optical distribution network;
    receive, over the optical distribution network, a plurality of upstream signals from the respective one or more subscribers; and
    combine the plurality of upstream signals,
    wherein to separate the modulated multi-wavelength optical signal into the plurality of sub-signals, the optical line terminal is further caused to perform:
    provide the amplified modulated multi-wavelength optical signal to an optical isolator,
    provide an output of the optical isolator to a collimator, and
    propagate, in opens outputs of the collimator to an optical multiplexer.

9. An optical line terminal according to claim 8, wherein the modulated multi-wavelength optical signal is separated by diffraction.

10. An according to claim 8, wherein the multi-wavelength optical signal is generated by a comb laser.

11. An optical line terminal according to claim 8, wherein the carrier wavelengths of the plurality of upstream signals are different from the carrier wavelengths of the plurality of sub-signals.

12. An optical line terminal according to claim 11, wherein the plurality of upstream signals are combined by diffraction.

13. A optical line terminal according to claim 11, wherein the plurality of upstream signals and the plurality of sub-signals are symmetrical.

14. An optical line terminal according to claim 8, wherein the optical distribution network is a passive optical network (PON).

15. A system comprising:
    a dedicated service platform configured to generate a multi-wavelength optical signal comprising a plurality of sub-signals corresponding to carrier wavelengths, modulate the plurality of sub-signals simultaneously with a content signal, amplify the modulated multi-wavelength optical signal, assign the carrier wavelengths to the one or more respective subscribers, separate the modulated multi-wavelength optical signal into the plurality of sub-signals, transmit the plurality of sub-signals individually from the dedicated service platform to one or more respective subscribers over an optical distribution network, receive, over the optical distribution network a plurality of upstream signals from the respective one or more subscribers, and combine the plurality of upstream signals, wherein to separate the modulated multi-wavelength optical signal into the plurality of sub-signals, the dedicated service platform configured to:
provide the amplified modulated multi-wavelength optical signal to an optical isolator,
provide an output of the optical isolator to a collimator, and
propagate, in open space, outputs of the collimator to an optical multiplexer.

16. A system according to claim 15,
wherein the optical multiplexer is configured to separate the modulated multi-wavelength optical signal into the plurality of sub-signals, and
wherein the carrier wavelengths of the plurality of upstream signals are different from the carrier wavelengths of the plurality of sub-signals.

17. A system according to claim 16, wherein the optical multiplexer is an optical diffraction grating.

18. A system according to claim 17, further comprising:
one or more tunable lasers configured to transmit the respective plurality of upstream signals over the optical distribution network.

\* \* \* \* \*